US007514639B2

(12) United States Patent
Heuer

(10) Patent No.: US 7,514,639 B2
(45) Date of Patent: Apr. 7, 2009

(54) APPARATUS, SYSTEM AND METHOD FOR WEIGHING LOADS IN MOTION

(75) Inventor: David M. Heuer, Cedar Lake, IN (US)

(73) Assignee: Technical Weighing Services, Inc., Griffith, IN (US)

( * ) Notice: Subject to any disclaimer, the term of this patent is extended or adjusted under 35 U.S.C. 154(b) by 206 days.

(21) Appl. No.: 11/524,805

(22) Filed: Sep. 21, 2006

(65) Prior Publication Data

US 2008/0073129 A1  Mar. 27, 2008

(51) Int. Cl.
*G01G 19/14* (2006.01)
*G01G 21/10* (2006.01)
(52) U.S. Cl. .................................... 177/147; 177/184
(58) Field of Classification Search .............. 177/147, 177/184–189
See application file for complete search history.

(56) References Cited

U.S. PATENT DOCUMENTS

| 3,556,237 | A | * | 1/1971 | Allison | 177/200 |
| 4,379,495 | A | * | 4/1983 | Cocks et al. | 177/1 |
| 4,715,457 | A | * | 12/1987 | Amacher et al. | 177/1 |
| 5,264,666 | A | * | 11/1993 | English et al. | 177/147 |
| 5,591,943 | A | * | 1/1997 | Cheng | 177/147 |
| 5,948,137 | A | | 9/1999 | Pflaum | |
| 6,303,882 | B1 | * | 10/2001 | Stephens et al. | 177/147 |
| RE40,099 | E | * | 2/2008 | Stephens et al. | 177/147 |

* cited by examiner

*Primary Examiner*—Randy W Gibson
(74) *Attorney, Agent, or Firm*—James Ray & Assoc.

(57) ABSTRACT

The apparatus for weighing a load in motion includes a rigid member, a plurality of strain gages mounted within the rigid member and forming a Wheatstone bridge network for measuring a force exerted by such load onto the rigid member and an accelerometer mounted within the rigid member for measuring gravitational acceleration of the load. A controller mounted in remote location compensates the measured force according to a measurement from the accelerometer and according to a predetermined algorithm to determine the actual weight of the load. Strain gages and accelerometer are connected to the controller by way of a wiring connection. The apparatus can be easily retrofitted into existing applications, particularly for loading scrap metal by way of a crane.

15 Claims, 3 Drawing Sheets

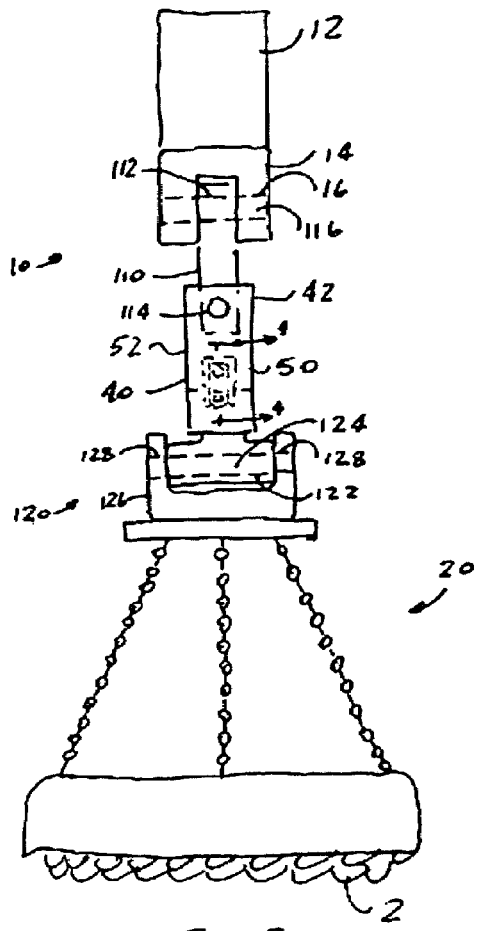
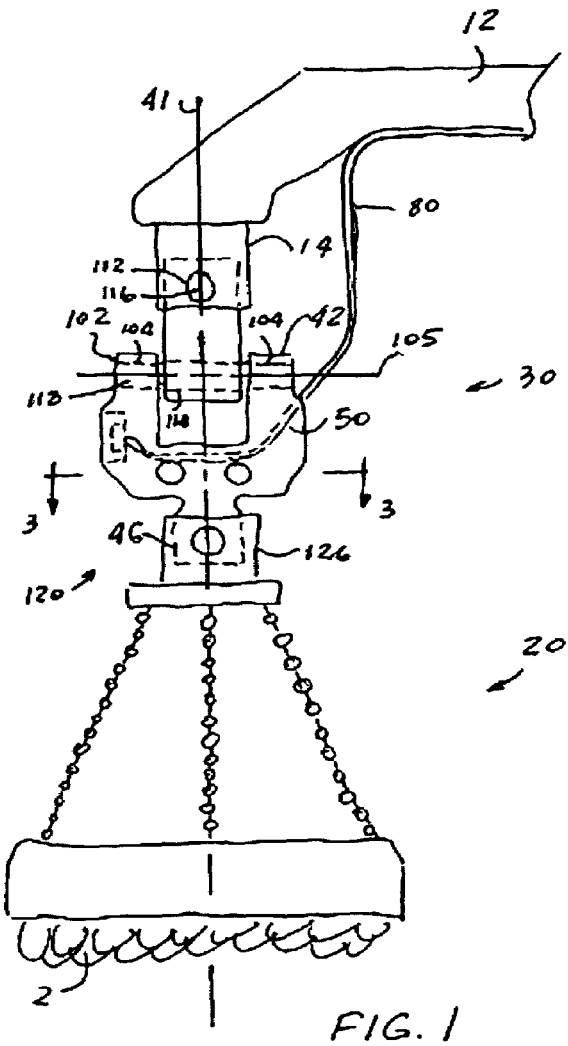
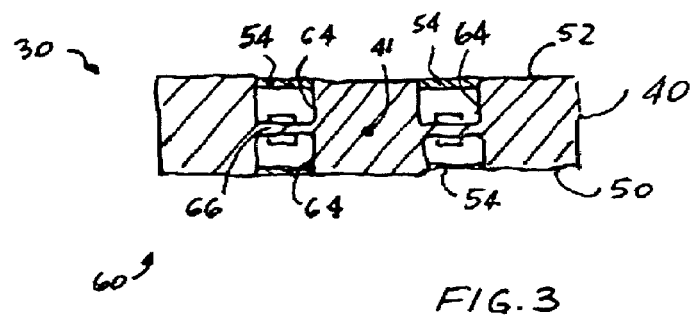
FIG. 2
FIG. 1
FIG. 3

APPARATUS, SYSTEM AND METHOD FOR WEIGHING LOADS IN MOTION

FIELD OF THE INVENTION

The present invention relates, in general, to weighing systems and, more particularly, this invention relates to an apparatus, system and method for weighing a load in motion and yet more particularly, the instant invention relates to an apparatus, system and method for weighing of a load being lifted and swung by a crane arm.

BACKGROUND OF THE INVENTION

As is generally well known, variety of applications exist wherein a load must be accurately weighed during movement from a stationary position into a load receiving apparatus. Pick up and loading of the refuse into a refuse collection vehicle and pick up and loading of scarp material into a railway car or truck are several of such variety of applications.

One commonly used method is to employ a static scale wherein the carrying vehicle is measured in both empty and loaded condition in order to determined the actual weight of the load. However, such method results in overloaded or under-loaded vehicles and increases the effort of loading such vehicle as a portion of the load must be removed from the overloaded vehicle to meet regulations and load must be added to the under-loaded vehicle to minimize transportation costs. Furthermore, a greater than desired effort is required to separately measure empty and loaded vehicles as the static scales generally located in a somewhat remote location from the location of the load.

Another method employed in weighing a load being lifted and swung by a crane arm employs a digital scale apparatus which is connected to the hook of the crane arm at one end and employs its own hook for attaching the load thereto. Such apparatus is disclosed in U.S. Pat. No. 5,948,137 issued on Sep. 7, 1999 to Pflaum and incorporates a load cell to measure the force exerted by such load, an accelerometer to compensate for load motion and a controller which outputs a weight of the load in response to such measured force and motion compensation. However, it has been found that such apparatus does not reliably weighs the load and requires a higher than desirable maintenance effort due to the mountings of battery and electronic components in close proximity to the load and therefore has not received wide acceptance.

SUMMARY OF THE INVENTION

According to one embodiment, the invention provides an apparatus for weighing a load in motion. The apparatus includes a rigid member having an upper end, a vertically opposed lower end which is oriented toward such load and is axially aligned with the upper end, a first vertical surface portion joining the upper end and the lower end and an opposed second vertical surface portion joining the upper end and the lower end. A first measuring means is attached to the rigid member in a vertical and axial alignment with such load for measuring a force exerted by such load onto the rigid member and for generating at least one force measurement signal which characterizes the measured force. A second measuring means is attached to the rigid member for measuring a predetermined parameter associated with a motion of such load and for generating at least one motion parameter measurement signal which characterizes the measured motion parameter. There is means which is coupled to each of the first measuring means and the second measuring means for transmitting the at least one force measurement signal and the at least one motion parameter measurement signal to a control means capable of executing a predetermined logic algorithm.

According to another embodiment of the invention, therein is provided an improvement for a load handling apparatus having a load moving portion and a load carrying device and capable of at least one of lifting and horizontally moving a load. The improvement comprises an apparatus for weighing such load in motion which includes a rigid member having an upper end, a vertically opposed lower end which is oriented toward such load and axially aligned with the upper end, a first vertical surface portion joining the upper end and the lower end and an opposed second vertical surface portion. A first measuring means is attached to the rigid member in a vertical and axial alignment with such load for measuring a force exerted by such load onto the rigid member and for generating at least one force measurement signal which characterizes the measured force. A second measuring means is attached to the rigid member for measuring a predetermined parameter associated with a motion of such load and for generating at least one motion parameter measurement signal which characterizes the measured motion parameter. There is means which is coupled to each of the first measuring means and the second measuring means for transmitting the at least one force measurement signal and the at least one motion parameter measurement signal to a control means capable of executing a predetermined logic algorithm. A first attachment means is provided for attaching the upper end of the rigid member to such load moving portion in a substantially semi-permanent fashion and a second attachment means is provided for attaching the lower end of the rigid member to such load carrying device in a substantially semi-permanent fashion.

According to yet another embodiment, the invention provides an improvement for a load handling apparatus having a load moving portion and a load carrying device and capable of at least one of lifting and horizontally moving a load. The improvement comprises a system for weighing such load in motion. The system includes a controller capable of executing a predetermined logic algorithm. A first measuring means is attached to the rigid member in a vertical and axial alignment with such load for measuring a force exerted by such load onto the rigid member and for generating at least one force measurement signal which characterizes the measured force. A second measuring means is attached to the rigid member for measuring a predetermined parameter associated with a motion of such load and for generating at least one motion parameter measurement signal which characterizes the measured motion parameter. There is means which is coupled to each of the first measuring means and the second measuring means for transmitting the at least one force measurement signal and the at least one motion parameter measurement signal to the controller. The controller which is mounted remotely from the first measuring means and the second measuring means compensates the measured force in accordance with the measured motion parameter and in accordance with the predetermined logic algorithm for determining an actual mass of such load as it being moved by such load handling apparatus.

According to a further embodiment of the invention, therein is provided an improvement for a load handling apparatus having a load moving portion, a load carrying device and a load sensor coupled therebetween, the load sensor having a housing and at least a force measuring member and a motion compensating member mounted within the housing. The improvement includes at least one shock absorber mounted between the motion compensating member and a predetermined portion of the housing for absorbing detrimental shock and vibration forces present in an operating environment of the load handling apparatus.

According to yet a further embodiment, the invention provides an improvement for a load handling apparatus having a load moving portion, a load carrying device and a load sensor coupled therebetween, the load sensor having at least a force measuring member, a motion compensating member and a controller coupled to the force measuring member and to the motion compensating member and capable of executing a predetermined logic algorithm wherein a measurement from such force measuring member is compensated by a measurement from such motion compensating member to determine an actual weight of such load during motion. The improvement includes a step of defining by such controller within such predetermined logic algorithm a steady state condition during motion of such load prior to determining such actual weight of such load.

According to another embodiment of the invention, therein is provided a method of dynamically weighing a load in motion. The method includes the step of measuring a force exerted by the load onto the load moving apparatus. Then, providing at least one force measurement signal which characterizes the measured force to a control means capable of executing a predetermined logic algorithm. Next, measuring a parameter associated with the motion of the load. Providing at least one motion parameter measurement signal which characterizes the measured motion parameter to the control means. Next, defining, by the control means, a steady state condition during the motion of the load. Finally, determining a mass of the load during the steady state condition.

According to a further embodiment, the invention provides an improved load carrying device having a rigid upper body for attachment to a load handling apparatus and a load carrying portion coupled to such rigid upper body. The improvement includes a first measuring means which is mounted within a first predetermined portion of such rigid upper body and in a vertical and axial alignment with such load for measuring a force exerted by such load onto the lifting device and for generating at least one force measurement signal which characterizes the measured force. There is a second measuring means which is mounted within a second predetermined portion of such rigid upper body for measuring a predetermined parameter associated with a motion of such load and for generating at least one parameter measurement signal which characterizes the measured motion parameter. There is means coupled to each of the first measuring means and the second measuring means for transmitting the at least one force measurement signal and the at least one motion parameter measurement signal to a controller capable of executing a predetermined logic algorithm.

OBJECTS OF THE INVENTION

It is, therefore, one of the primary objects of the present invention to provide apparatus, system and method for weighing a load in motion.

Another object of the present invention is to provide apparatus, system and method for weighing a load being lifted and swung by a crane arm.

Yet another object of the present invention is to provide apparatus, system and method for weighing a load in motion which provides for a high degree of accuracy.

A further object of the present invention is to provide a system and a method for weighing a load in motion wherein the control device is mounted remotely from the load.

Yet a further object of the present invention is to provide an apparatus for weighing a load in motion which can be easily retrofitted into existing applications.

An additional object of the present invention is to provide apparatus, system and method for weighing a load in motion which employ force measurement and motion compensation devices.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a front elevation view of an apparatus for weighing a load in motion of the present invention constructed according to one embodiment of the invention;

FIG. 2 is a side elevation view of the apparatus for weighing a load in motion of FIG. 1;

FIG. 3 is a cross-sectional view of the apparatus for weighing a load in motion along lines 3-3 of FIG. 1;

BRIEF DESCRIPTION OF THE VARIOUS EMBODIMENTS OF THE INVENTION

Figure 5:
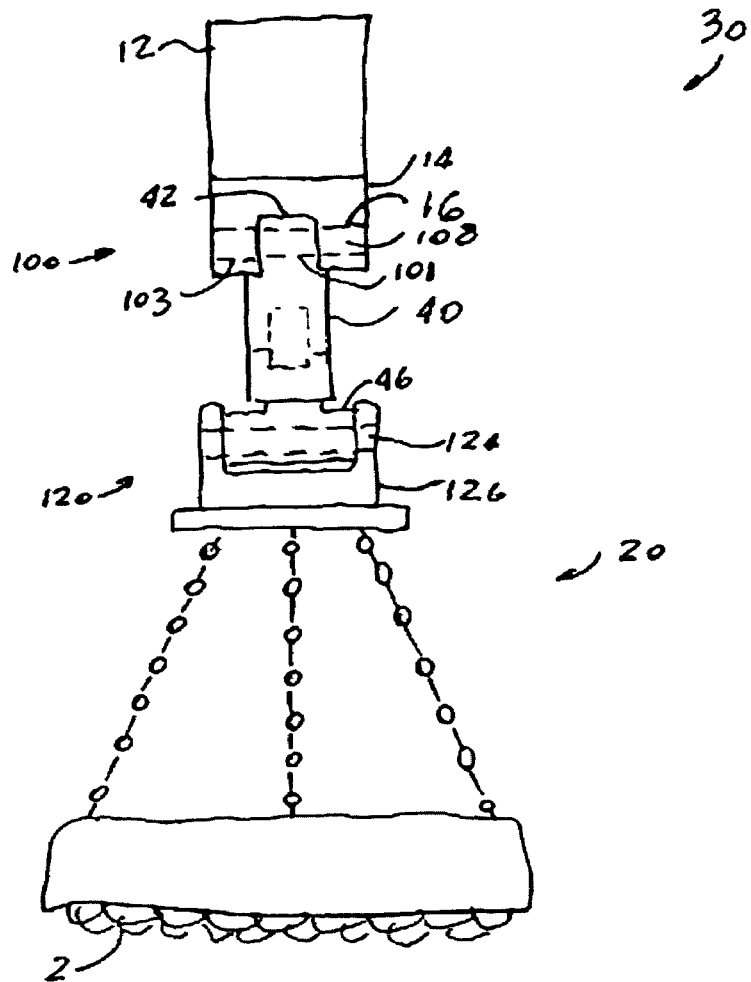
FIG. 5 is a functional block diagram of the apparatus for weighing a load in motion of FIG. 1.

Prior to proceeding to the more detailed description of the present invention, it should be noted that, for the sake of clarity and understanding, identical components which have identical functions have been identified with identical reference numerals throughout the several views illustrated in the drawing figures.

According to a first embodiment, the present invention provides an apparatus, generally designated as 30, for weighing a load 2 in motion. Now in reference to FIGS. 1-2, the apparatus 30 includes a rigid member 40 having an upper end 42 and a vertically opposed lower end 46 which is oriented toward such load 2 and is axially aligned with the upper end 42. A first vertical surface portion 50 and an opposed second vertical surface portion 52 join the upper end 42 with the lower end 46. The presently preferred material of the rigid member 40 is steel.

A first measuring means, generally designated as 60, is attached to the rigid member 40 in a vertical and axial alignment with such load 2 for measuring a force exerted by such load 2 onto the rigid member 40 and for generating at least one force measurement signal which characterizes the measured force. As it is well known, such first measuring means includes a strain gage 62 and a cavity 64 formed in the rigid member 40 for mounting such strain gage 62. Alternatively, such measuring means 60 is essentially a load cell having four strain gages 62 which are connected in series to form a Wheatstone bridge network and which are mounted within a single cavity 64 formed in the rigid member 40. Such embodiment would be advantageous in using a commercially available load cell.

In the presently preferred embodiment of the invention, such first measuring means 60 includes four strain gages 62 which are connected in series to form a Wheatstone bridge network and four cavities 64, each receiving one strain gage 62.

As best shown in FIG. 3, the cavities 64 are formed in two pairs of opposed cavities 64. The cavities 64 in each pair are aligned with each other in a horizontal plane. One cavity 64 is formed in the first surface portion 50 and the opposed cavity 64 is formed in the second surface 52. The depth of each cavity 64 is predetermined to form a vertically oriented wall portion 66 which is generally aligned with a vertical axis 41 and which is capable of deforming under the force applied by such load 2 onto the rigid member 40. One strain gage 62 is bonded to each surface of such wall portion 66. The presently preferred thickness of the wall portion 66 is about 0.13 inches.

In further reference to FIG. 3, one pair of cavities 64 is disposed at a predetermined distance to the left from the vertical axis 41 and the other pair of cavities 64 is disposed at the same predetermined distance to the right from the vertical axis 41. Furthermore, all four cavities 64 are aligned with each other in the horizontal plane. In such embodiment, all four strain gages 62 are centered about the vertical axis 41 and are also aligned with each other in the horizontal plane. Furthermore, the force exerted by such load 2 and measured by the first measuring means 60 is a shear force.

Preferably each cavity 64 is closed with a cover 54 by way of a pres-fitting method and a sealant (not shown) is employed to seal engagement of the cover 54 with the cavity 64 and, more particularly, protect strain gage 62 from detrimental environmental elements such as dust, dirt, moisture and the like.

The locations of the cavities 64 and, subsequently, the strain gages 62 are determined to provide optimum sensitivity during force measurement based on the shape and size of the rigid member 40.

Figure 4:
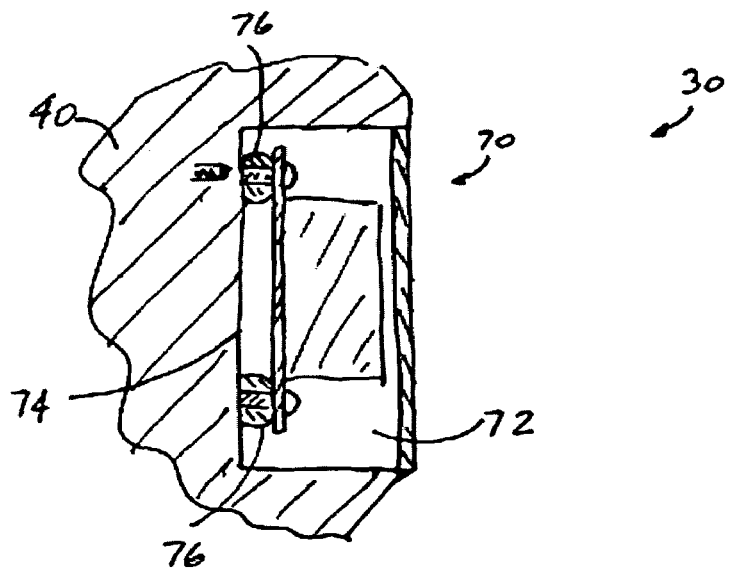
FIG. 4 is a cross-sectional view of the apparatus for weighing a load in motion along lines 4-4 of FIG. 2.

The apparatus 30 further includes a second measuring means, which is attached to the rigid member 40 for measuring a predetermined parameter associated with a motion of such load 2 and for generating at least one motion parameter measurement signal which characterizes the measured motion parameter. In the presently preferred embodiment of the invention, the second measuring means is an accelerometer 70 and the motion parameter is a gravitational acceleration of such load 2. As best shown in FIG. 4, the accelerometer 70 is mounted to a vertical wall 74 of a cavity 72 which is formed in the rigid member 40 to measure the gravitational acceleration of the load 2 in a vertical plane. Any one of commercially available accelerometers is suitable for use with the present invention. The accelerometer 70 may be mounted in any location within the rigid member 40 providing that the gravitational acceleration of the load 2 is measured in a vertical plane.

To improve reliability of eight measurement, means 76, such as at least one well known shock absorber 76, is disposed intermediate the accelerometer 70 and the vertical wall 74 of the cavity 72 for absorbing detrimental shock and vibration forces present in an operating environment of the apparatus 30. An optional means 78 may be coupled to at least one of the first measuring means 60 and the second measuring means 70 for protecting their operation from at least electro-magnetic interference present in the operating environment of the apparatus 30. Preferably, such means 78 employs a simple solid state resistor-capacitor (RC) network. It is further preferred that such means 78 is only employed in combination with the second measuring means 70.

Additionally, the apparatus 30 includes means, generally designated as 80, which is coupled to each of the first measuring means 60 and the second measuring means 70 for transmitting the at least one force measurement signal and the at least one parameter measurement signal to a control means 90 capable of executing a predetermined logic algorithm.

Such signal transmitting means 80 may be a wireless RF transmitter and preferably, the signal transmitting means 80 includes a wiring connection between each of the first measuring means 60 and the second measuring means 70 and the control means 90.

Figure 6:
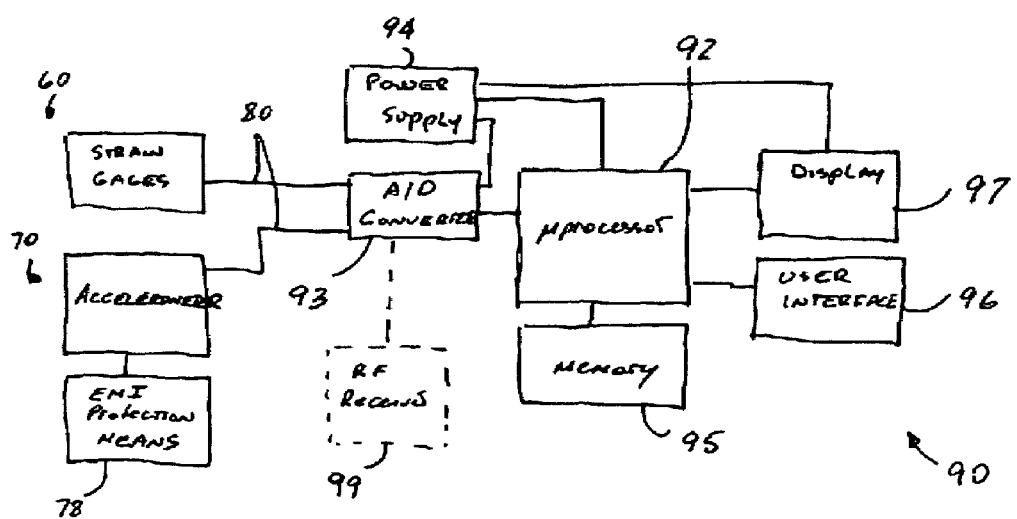
FIG. 6 is a side elevation view of the apparatus for weighing a load in motion constructed according to another embodiment of the present invention.

According to a second embodiment, the invention provides a system for weighing the load 2 in motion, which includes an apparatus 30 having a rigid member 40, a first measuring means 60 for measuring a force exerted by such load 2 onto the rigid member 40 and for generating at least one force measurement signal which characterizes the measured force, a second measuring means 70 for measuring a predetermined parameter associated with a motion of such load 2 and for generating at least one parameter measurement signal which characterizes the measured motion parameter and a signal transmitting means 80 which is coupled to the first measuring means 60 and to the second measuring means 70. The system further includes control means 90, best shown in FIGS. 6-7, which receives the at least one force measurement signal and the at least one parameter measurement signal by way of the signal transmitting means 80. Preferably, the control means 90 includes a microprocessor 92 for executing the predetermined logic algorithm, at least one Analog to Digital (A/D) converter 93, power supply 94 and memory 95. A user interface 96 which includes a plurality of functional and alphanumeric keys 94a and at least one switch 94b is provided for manipulating the control means 90. An optional display 97 is provided for displaying the measured weight of the load 2. When the transmitting means 80 is of the wireless type, the control means 90 is adapted with at least one RF receiver 99 for receiving the at least one parameter measurement signal and the at least one parameter measurement signal.

It is further preferred that the control means 90 are to be mounted remotely from the rigid member 40. It has been found that such remote mounting of the control means 30 at least partially increases operational reliability and accuracy of the measured weight of the load 2 as the performance of such control means 90 is not influenced by the operating environment experienced by the rigid member 40. When the control means 90 is mounted in the remote location, a measurement accuracy of equal to or less than 1 percent has been achieved in weighing the load 2 in motion. Accuracy of weighing the load 2 in a static condition has been determined to be about 0.2 percent.

Alternatively, in applications that do not require the above stated degree of accuracy, the control means 90 may be mounted within the rigid member 40 according to a disclosure in U.S. Pat. No. 5,948,137 which is incorporated into this document by reference thereto. Accordingly, the transmitting means 80 is adapted to transmit the measured value of the load 2 to a remotely mounted receiver or a computer (not shown).

It has been also found that mounting of the accelerometer 70 to a vertically disposed portion of the rigid member 40 for measuring gravitational acceleration of the load 2 in a vertical plane at least partially increases accuracy and reliability of the apparatus 30. It has been additionally found that employment of the at least one shock absorber 76 contributes to improved accuracy and reliability of the apparatus 30.

The use of the apparatus 30 will be illustrated in combination with a load handling apparatus having a load moving portion and a load carrying device, generally designated as 20.

Figure 7:
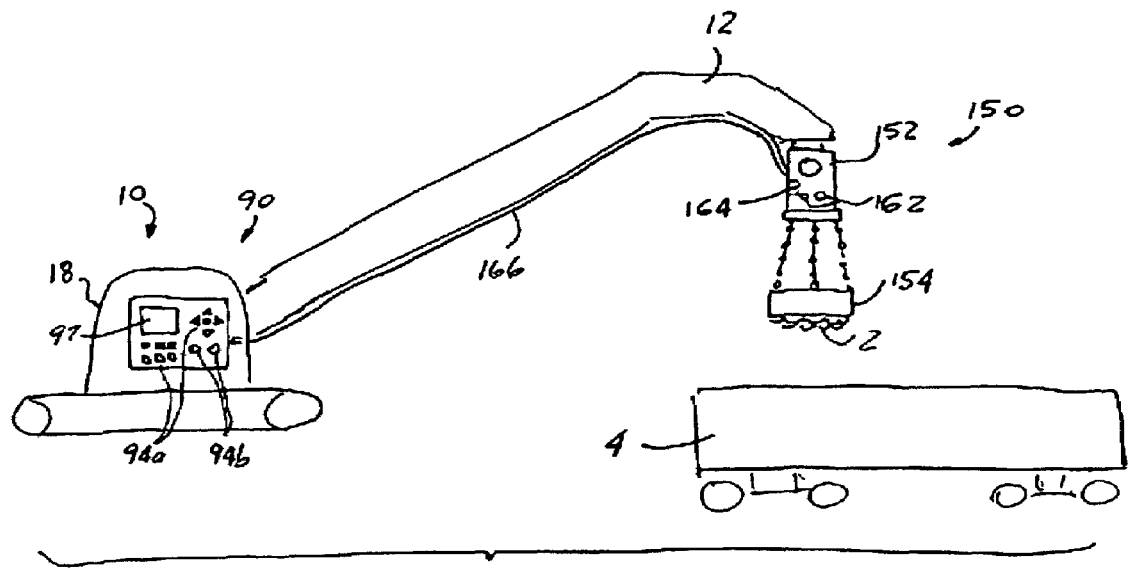
FIG. 7 is a schematic diagram of the apparatus for weighing a load in motion constructed according to yet another embodiment of the present invention.

In further reference to FIGS. 1-2 and 7, such load handling apparatus is a crane, generally designated as 10, having a load arm 12 and capable of at least one of lifting and horizontally swinging the load 2. The load carrying device 20 may be one of electromagnet, hook, claw, jaw, bucket and various combinations thereof. By way of example of FIGS. 1-2 and 7, the load carrying device 20 is illustrated as the electromagnet.

Essentially, the apparatus 30 is mounted between the distal end 14 of the load arm 12 and the load carrying device 20. Accordingly, the apparatus 30 is provided with a first attachment means, generally designated as 100, for attaching the upper end 42 of the rigid member 40 to such load arm 12 in a substantially semi-permanent fashion.

Now in reference to FIG. 5, such first attachment means 100 may include the upper end 42 of the rigid member 40 sized to fit a distal end 14 of such load arm 12. An aperture 101 is formed within the upper end 42. A shaft member 108 is passed trough a combination of the aperture 101 and an aperture 16 formed in such distal end 14 of such load arm 12 and aligned with the aperture 101 of the upper end 42 for pivotally attaching the upper end 42 to the distal end 14 of the load arm 12.

In a further reference to FIGS. 1-2, such first attachment means 100 preferably includes a bifurcated portion 102 formed in the upper end 42 and sized to receive a distal end 14 of such load arm 12. A pair of apertures 104 are formed within the bifurcated portion 102 and disposed about a common horizontal axis 105. There is an elongated link 110 which has a first aperture 112 being formed adjacent a first end and a second aperture 114 being formed adjacent an opposed second end of the link 110. In operation, longitudinal axis of each of the first aperture 112 and the second aperture 114 are disposed in a horizontal plane and are perpendicular to each other. A first shaft member 116 is passed through a combination of the first aperture 112 and a complimentary aperture 16 formed in such distal end 14 of such load arm 12 for pivotally connecting the link 110 to such load arm 12. A second shaft member 118 is passed trough the pair of apertures 104 of the bifurcated end 102 and the second aperture 114 formed in the link 110 and aligned with the pair of apertures 104 for pivotally connecting the link 110 to the rigid member 40. It will be appreciated that a pivotal connection of the link 110 to such load arm 12 in combination with a pivotal connection of the bifurcated upper end 42 to the link 110 enable a rotational freedom of the rigid member 40 about such load arm 12. A plurality of simple tubular type bearings (not shown) each mounted within a respective one of plurality of apertures 16, 104, 112, and 114 may be provided for aiding pivotal movement of the upper end 42 about the distal end 14.

Alternatively, the first attachment means 100 may include one of a universal joint means (not shown) and a swivel joint means (not shown) for enabling a rotational freedom of the rigid member 40 about such load arm 12.

The apparatus 30 is further provided with a second attachment means, generally designated 120, for attaching the lower end 44 of the rigid member 40 to such load carrying device 20. Such second attachment means 120 includes an aperture 122 formed within the lower end 40 of the rigid member 40 and a shaft member 124 passed through the aperture 122 and through a pair of apertures 128 formed within a bifurcated end 126 of such load carrying device 20 for pivotally connecting the rigid member 40 thereto.

It will be appreciated that the existing load moving and carrying devices can be easily retrofitted with the apparatus 30 and the control means 90 for weighing the load 2 in motion.

According to a third embodiment, the invention provides a method of dynamically weighing a load 2 in motion. Such method includes the step of measuring a force exerted by the load 2 onto the load moving apparatus 12. Then, providing at least one force measurement signal which characterizes the measured force to the control means 90 capable of executing a predetermined logic algorithm. Next, measuring a parameter associated with the motion of the load 2. Providing at least one motion parameter measurement signal which characterizes the measured motion parameter to the control means 90. Next, defining, by the control means 90, a steady state condition during the motion of the load 2. Finally, determining a mass of the load 2 during the steady state condition.

In the presently preferred embodiment of the invention, the steady state condition is defined by incrementally calculating a change of the measured mass over time and determining when the change is within a predetermined threshold. The method contemplates the step of annunciating the steady state condition prior to measuring the mass of the load 2.

The method further includes the step of compensating for a predetermined mass of the load carrying device 20 when measuring the mass of the load 2.

To aid in using the measured weight, the method further includes the step of displaying the measured mass as the weight of the load 2 on the display 97 and an additional step of saving the weight to a database.

The method contemplates that the operator of the load moving apparatus 10 is able, by way of manipulating the user interface 96, to weigh distinct content loads 2 in a mix content mode of operation. This is particularly advantageous in blending a plurality of scrap metal types into a single load or simultaneously loading a plurality of load receiving vehicles 4 such as railcars, trucks or scrap buckets. By way of example of blending two distinct metal types, the operator, using the user interface keys 94a selects a type of the vehicle 4, inputs identification parameter of the first chosen scrap metal type into the control means 90 and then proceeds to accumulate and move the first metal type for loading into the vehicle 4. While the load 2 is in motion, the operator operates a predetermined switch 94b to measure and record the carried mass of the load 2. The operator is then able to input identification parameter of the second scrap metal type into the control means 90 and proceed to accumulate and move such second metal type for loading into the vehicle 4. The operator can continue to alternate loading the first and second metal types until a predetermined blended weight has been achieved. Once finished, the operator will operate another switch 94b to store at least one of the total weight of the blended load, types of blended metals and individual weight of each distinct metal type to a database.

At a predetermined intervals, for example at the end of the work shift, the operator can print or transmit a record of the completed effort.

In further reference to FIG. 7 and according to a forth embodiment, the invention provides an improved load carrying device, generally designated as 150, which includes a rigid upper body 152 for attachment to a load arm 12 of the load moving apparatus 10 and a load carrying member 154 which is coupled to such rigid upper body 152. By way of the example of FIG. 7, such load carrying device is illustrated as the electromagnet 150. A first measuring means 160 is mounted within a first predetermined portion of such rigid upper body 152 and in a vertical and axial alignment with such load 2 for measuring a force exerted by such load 2 onto the load carrying device 150 and for generating at least one force measurement signal which characterizes the measured force. There is a second measuring means 162 which is mounted within a second predetermined portion of such rigid upper body 152 for measuring a predetermined parameter associated with a motion of such load 2 and for generating at least one parameter measurement signal which characterizes the measured motion parameter. The improved load carrying device 150 further includes means 166 which is coupled to each of the first measuring means 162 and the second measuring means 164 for transmitting the at least one force measurement signal and the at least one parameter measurement signal to a control means 90 capable of executing a predetermined logic algorithm.

The first measuring means 160 is a plurality of strain gages 160 and the second measuring means 162 is an accelerometer 162 which are employed substantially identical to the strain gages 62 and the accelerometer 70 disclosed in combination with the rigid member 40.

Although the present invention has been shown in terms of handling the load 2 by way of the crane 10 having a load arm 12, it will be apparent to those skilled in the art, that the present invention may be applied to other load handling devices. For example, the present invention can be applied to a gantry type crane. Furthermore, at least a method of determining a steady state condition by way of incrementally calculating a change of the measured mass over time and determining when the change is within a predetermined threshold measuring the mass of the load may be advantageous for use in a refuse collection vehicle.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An apparatus for weighing a load in motion, said apparatus comprising:
   (a) a rigid member having an upper end, a vertically opposed lower end which is oriented toward such load and is axially aligned with said upper end, a first vertical surface portion joining said upper end and said lower end and an opposed second vertical surface portion joining said upper end and said lower end, wherein such load is suspended from said lower end of said rigid member;
   (b) a first measuring means mounted internal to said rigid member in a vertical and axial alignment with such load for measuring a force exerted by such load onto said rigid member and for generating at least one force measurement signal, said at least one force measurement signal characterizing said measured force;
   (c) a second measuring means mounted internal to said rigid member for measuring a predetermined parameter associated with a motion of such load and for generating at least one motion parameter measurement signal, said at least one motion parameter measurement signal characterizing said measured motion parameter; and
   (d) means coupled to each of said first measuring means and said second measuring means for transmitting said at least one force measurement signal and said at least one motion parameter measurement signal to a control means capable of executing a predetermined logic algorithm.

2. The apparatus, according to claim 1, wherein said first measuring means includes:
   (a) a first pair of opposed cavities each formed in a respective one of said first surface portion and said second surface portion of said rigid member and disposed at a predetermined distance from a vertical axis of said rigid member, said first pair of opposed cavities forming a first vertically oriented wall portion capable of deforming under said force applied by such load onto said rigid member;
   (b) a second pair of opposed cavities each formed in said respective one of said first surface portion and said second surface portion of said rigid member and disposed at said predetermined distance from said vertical axis of said rigid member and opposing said first pair of opposed cavities, said second pair of opposed cavities forming a second vertically oriented wall portion capable of deforming under said force applied by such load onto said rigid member, said second pair of opposed cavities is horizontally aligned with said first pair of opposed cavities;
   (c) a first pair of strain gages, each securely fixed to a respective surface of said first vertically oriented wall portion;
   (d) a second pair of strain gages, each securely fixed to a respective surface of said second vertically oriented wall portion; and
   (e) said first pair of strain gages and said second pair of strain gages being connected in series to form a Wheatstone bridge network.

3. The apparatus, according to claim 1, wherein said second measuring means is an accelerometer and wherein said motion parameter is a gravitational acceleration of such load.

4. The apparatus, according to claim 3, wherein said accelerometer is mounted to a vertical wall of a cavity formed in said rigid member to measure said gravitational acceleration in a vertical plane.

5. The apparatus, according to claim 4, wherein said apparatus includes means disposed intermediate said accelerometer and said vertical wall of said cavity formed in said rigid member for absorbing detrimental shock and vibration forces present in an operating environment of said apparatus.

6. The apparatus, according to claim 1, wherein said signal transmitting means includes at least one of a wired and wireless connection means.

7. The apparatus, according to claim 1, wherein said apparatus further includes said control means capable of executing said predetermined logic algorithm.

8. The apparatus, according to claim 7, wherein said control means is mounted in a remote location.

9. In combination with a load handling apparatus having a load moving portion and a load carrying device and capable of at least one of lifting and horizontally moving a load, the improvement comprising an apparatus for weighing said load in motion, said apparatus including:
   (a) a rigid member having an upper end, a vertically opposed lower end which is oriented toward said load and axially aligned with said upper end, a first vertical surface portion joining said upper end and said lower end and an opposed second vertical surface portion;
   (b) a first measuring means attached to said rigid member in a vertical and axial alignment with said load for measuring a force exerted by said load onto said rigid member and for generating at least one force measurement signal, said at least one force measurement signal characterizing said measured force;
(c) a second measuring means mounted internal to said rigid member for measuring a predetermined parameter associated with a motion of said load and for generating at least one motion parameter measurement signal, said at least one motion parameter measurement signal characterizing said measured movement parameter;
(d) means coupled to each of said first measuring means and said second measuring means for transmitting said at least one force measurement signal and said at least one motion parameter measurement signal to a control means capable of executing a predetermined logic algorithm;
(e) a first attachment means for attaching said upper end of said rigid member to said load moving portion in a substantially semi-permanent fashion; and
(f) a second attachment means for attaching said lower end of said rigid member to said load carrying device in a substantially semi-permanent fashion, wherein said load is suspended from said lower end of said rigid member.

10. The combination, according to claim 9, wherein said load handling apparatus is a crane having a load arm and wherein said first attachment means includes:
(a) a bifurcated portion formed in said upper end;
(b) a pair of apertures formed within said bifurcated portion and disposed about a common horizontal axis;
(c) an elongated link having a first aperture formed adjacent a first end and a second aperture formed adjacent an opposed second end of said link, wherein longitudinal axis of each of said first aperture and said second aperture are disposed in a horizontal plane and are perpendicular to each other;
(d) a first shaft member passed through a combination of said first aperture formed in said link and a complimentary aperture formed in said distal end of said load arm for pivotally connecting said link to said load arm; and
(e) a second shaft member passed trough said pair of apertures of said bifurcated end and said second aperture formed in said link and aligned with said pair of apertures formed within said bifurcated portion for pivotally connecting said link to said rigid member, whereby a pivotal connection of said link to said load arm in combination with a pivotal connection of said bifurcated upper end to said link enable a rotational freedom of said rigid member about said load arm.

11. The combination, according to claim 9, wherein said second attachment means includes:
(a) an aperture formed within said lower end of said rigid member; and
(b) a shaft member passed through said aperture and through a pair of apertures formed within a bifurcated end of said load carrying device for pivotally connecting said rigid member thereto.

12. The combination, according to claim 9, wherein said load carrying device is one of magnet, hook, claw, jaw, bucket and various combinations thereof.

13. In combination with a load handling apparatus having a load moving portion and a load carrying device and capable of at least one of lifting and horizontally moving a suspended load, the improvement comprising a system for weighing said load in motion, said system including:
(a) a control means capable of executing a predetermined logic algorithm;
(b) a first measuring means mounted internal within a rigid member of said load carrying device and coupled to said control means for measuring a force exerted by said load onto said load carrying device and for providing at least one force measurement signal to said control means, said at least one force measurement signal characterizing said measured force;
(c) a second measuring means mounted internal within a rigid member of said load carrying device and coupled to said control means for measuring a predetermined parameter associated with a motion of said load and for providing at least one parameter measurement signal to said control means, said at least one motion parameter measurement signal characterizing said measured movement parameter;
(d) means for coupling said first measuring means and said second measuring means to said control means; and
(e) whereby said control means which is mounted remotely from said first measuring means and said second measuring means compensates said measured force in accordance with said measured motion parameter and in accordance with said predetermined logic algorithm for determining an actual mass of said load as it being moved by said load handling apparatus.

14. In combination with a load handling apparatus having a load moving portion, a load carrying device and a load sensor coupled therebetween, said load sensor having a housing and at least a force measuring member and a motion compensating member mounted within said housing, the improvement comprising means mounted between said motion compensating member and a predetermined portion of said housing for absorbing detrimental shock and vibration forces present in an operating environment of said load handling apparatus, whereby said shock and vibration absorbing means position said motion compensating member in spaced relationship with said predetermined portion of said housing and whereby said motion compensating member is fastened to said predetermined portion of said housing through said shock and vibration absorbing means.

15. In combination with a load carrying device having a rigid upper body for attachment to a load handling apparatus and a load carrying portion coupled to said rigid upper body, the improvement comprising:
(a) a first measuring means mounted within a first predetermined portion of said rigid upper body and in a vertical and axial alignment with said load for measuring a force exerted by said load onto said lifting device and for generating at least one force measurement signal, said at least one force measurement signal characterizing said measured force, wherein said load is suspended below said first measuring means;
(b) a second measuring means mounted within a second predetermined portion of said rigid upper body for measuring a predetermined parameter associated with a motion of said load and for generating at least one parameter measurement signal, said at least one motion parameter measurement signal characterizing said measured motion parameter; and
(c) means coupled to each of said first measuring means and said second measuring means for transmitting said at least one force measurement signal and said at least one motion parameter measurement signal to a control means capable of executing a predetermined logic algorithm.

* * * * *